United States Patent [19]

Moore

[11] Patent Number: 4,575,803
[45] Date of Patent: Mar. 11, 1986

[54] ENGINE MONITOR AND RECORDER

[75] Inventor: M. Samuel Moore, Northridge, Calif.

[73] Assignee: Semco Instruments, Inc., No. Hollywood, Calif.

[21] Appl. No.: 335,841

[22] Filed: Dec. 30, 1981

[51] Int. Cl.[4] .............................................. G01K 7/02
[52] U.S. Cl. ................................. 364/551; 364/550; 364/557; 346/33 TP
[58] Field of Search ............... 364/424, 508, 550, 551, 364/552, 557, 569; 73/186, 787; 340/52 R; 346/33 R, 33 TP

[56] References Cited

U.S. PATENT DOCUMENTS

| | | | |
|---|---|---|---|
| 3,237,448 | 3/1966 | Howell et al. | 364/557 |
| 3,250,901 | 5/1966 | Brahm | 364/557 |
| 3,946,364 | 3/1976 | Codomo et al. | 364/900 |
| 4,135,246 | 1/1979 | McMannis | 364/569 X |
| 4,400,783 | 8/1983 | Locke, Jr. et al. | 364/550 X |

Primary Examiner—Gary Chin
Assistant Examiner—Edward R. Cosimano
Attorney, Agent, or Firm—Poms, Smith, Lande & Rose

[57] ABSTRACT

A turbine engine monitoring and recording system includes an engine mounted unit which contains at least a non-volatile memory and a data-processor, and a remote unit suitable for either cockpit mounting or for accessing by a ground portable unit including an additional data-processor and a display unit. Thermocouples and other sensors mounted on the engine supply raw data to the engine mounted electronics unit, and this input information includes temperature data. Elevated over-temperature levels are segregated and the time during which the engine is within each of the over-temperature bands is measured, and is recorded in a non-volatile, electronically alterable memory which is periodically updated during operation of the aircraft. The number of starts is also counted and stored, and the total running time of the engine is also recorded. Upon command from the remote unit, information is transferred from the non-volatile memory to the remote display unit, so that the time at which the turbine has been operated at specific over-temperature levels may be readily accessed.

11 Claims, 10 Drawing Figures

ENGINE MONITOR AND RECORDER

FIELD OF THE INVENTION

This invention relates to turbine engine monitoring equipment.

BACKGROUND OF THE INVENTION

It has previously been proposed to monitor the temperature of a turbine engine, particularly at over-temperature levels, and one such over-temperature monitoring system is disclosed in U.S. Pat. No. 3,931,619. Another system of this general type is disclosed in the copending patent application of Geoffrey Hancock, U.S. patent application Ser. No. 197,008, filed Oct. 14, 1980, now U.S. Pat. No. 4,315,296, and assigned to the assignee of the present invention. In these prior arrangements, predetermined weighting characteristics were established and alarm signals were energized when the turbine engine exceeded such predetermined overall limits. These control systems characteristically involve a summation function in which the time at some very high temperature would be equated to a longer time at a slightly lower temperature, and the sum of the weighted factors would be employed to provide an output indication which would give a rough indication of the over-temperature stress or damage to the turbine engine which may have occurred.

However, it would be desirable to have a more accurate indication of the precise amount of time that the turbine engine has been operated, and that it has been operated at particular temperature levels. In addition, supplemental information such as the number of times that the engine has started is also relevant in determining whether periodic maintenance of the engine is appropriate. Further, in the analysis of the maintenance status of a turbine engine or the reason for certain anomalies in engine performance, it is frequently desirable to be able to determine the details of the recent past history of the operation of the engine in greater detail than has been possible heretofore.

Accordingly, the present invention is intended to overcome the shortcomings of the prior art systems and to provide the more complete historical information of the type outlined hereinabove.

SUMMARY OF THE INVENTION

In accordance with a specific illustrative embodiment of the invention, each turbine engine of a multi-engine aircraft is provided with an engine mounted electronics unit including a data-processor, and a permanent non-volatile memory unit which may be electronically erased and updated. Inputs to the engine-mounted unit include a thermocouple input, or input from some other type of temperature sensor, for providing a continuous indication of the temperature of the turbine engine. The analog temperature input information is converted to digital form and is compared with a certain preset temperature ranges or channels, which conform to an address or a location in the non-volatile memory in which temperature information relative to the particular temperature channel is stored. The previously stored digital information is withdrawn from storage and is updated with the supplemental information, and the revised time information for the particular temperature channel is then returned to the non-volatile storage unit. Located remote from the engine unit, either in a portable service unit or in a cockpit mounted unit, is an additional microprocessor, and a digital display, along with switches for calling up the desired temperature information and having it displayed. The digital information may be transmitted serially from the non-volatile memory in the engine-mounted unit to the remote display unit. With this arrangement, only a few wires need be connected from each of the engine mounted units to the remote electronics.

In accordance with a broader aspect of the invention, a turbine engine monitoring and recording system includes an engine-mounted electronic circuit unit having a data-processor and a non-volatile memory; a thermocouple mounted on the engine for supplying temperature data to said engine mounted unit; and additional electronic circuitry remote from the turbine engine including an additional data-processor and display arrangements. Circuit means are included in the engine mounted electronic circuit unit for storing information indicating the number of times the turbine engine has been operated, and the length of time that the turbine engine has been operated within each of a plurality of discrete temperature ranges; and switching means are provided in association with the remote electronic unit for ordering and displaying selected information relative to the length of time the engine has been operated in selected ones of the temperature channels.

Other objects, features and advantages of the invention will become apparent from a consideration of the following detailed description and from the accompanying drawing.

DETAILED DESCRIPTION

Figure 1:
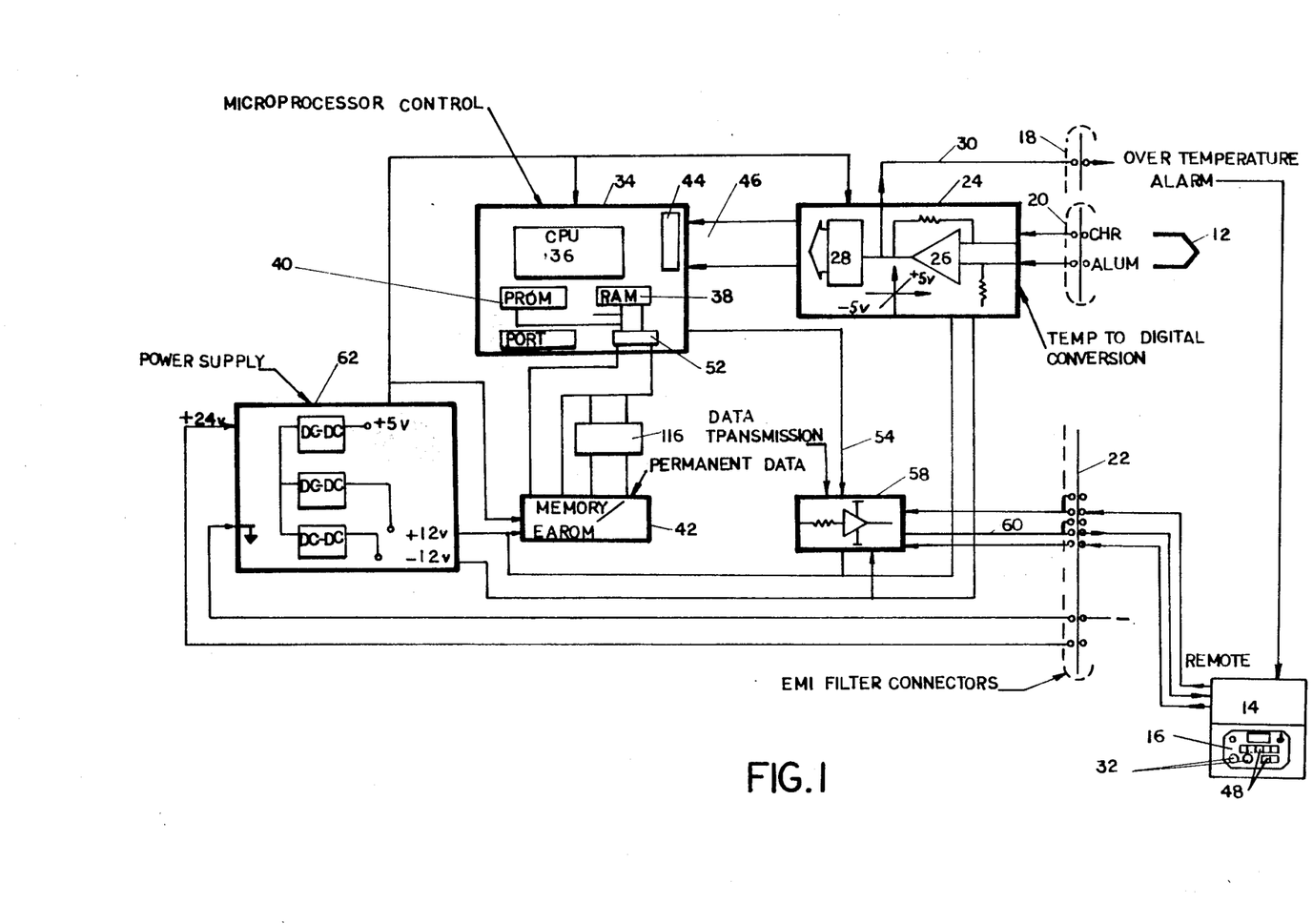
FIG. 1 is a block circuit diagram illustrating the system of the present invention.

Referring more particularly to the drawings, FIG. 1 essentially shows the engine mounted electronic unit, with only the thermocouple 12 and the remote electronic unit 14 with its associated display 16 being schematically shown to the right in FIG. 1 outside of the electronic connections 18, 20 and 22.

The input from thermocouple 12 is processed in unit 24 which includes an operational amplifier 26 which receives and amplifies the signal from thermocouple 12, and the analog to digital converter 28 which provides 10 binary digits or bits as an output signal indicating the temperature level. An over-temperature alarm signal is routed on lead 30 through connector 18 to the remote unit 14 where over-temperature alarm lights 32 signal excessive temperture for the left or the right engine.

The electronic unit 34 includes a data-processor having a central processing unit 36. A random access memory 38 and a program read-only memory 40. A non-volatile memory 42 is employed to store cumulative, long-term temperature information of the history of the turbine engine with which the electronic unit is associated, as more fully described below.

Now, on the following page a typical table of temperature channel specifications is set forth. This temperature specification table includes the channels of information which may be obtained and displayed in the display unit 16. More specifically, the temperature channel specifications as set forth in table I indicate a discrete set of temperature bands. Thus, for example, temperature channel 3 relates to the temperature range between 819.5° C. and 830.8° C. Included in the PROM 40 is a table indicating these temperature bands and limits as set forth in Table I. The information from the analog-to-digital converter 28 as supplied to the input-/output circuit 44 over bus 46 is periodically sampled and compared with the temperature bands as set forth in Table I and as included in the PROM 40. Within the non-volatile memory 42 are a set of memory storage locations corresponding respectively to each of the many channels included in table I. Following the comparison step mentioned above, the channel or channels which are involved are identified, and the information is withdrawn from memory 42 and held in local storage, and is incremented by a time interval corresponding to the processing and sampling rate of the microprocessor 34. The modified or incremented information is then returned to the storage unit 42.

5. Withdrawal of Stored Information From All Channels Lower Than the Indicated Temperature Channel.

6. Incrementing of Data from these Memory Locations

7. Return of Modified Channel Information to Memory Storage Locations in Non-Volatile Memory.

8. For (A) Channels, an Allowable Time Period is Substracted From the Increment by Which the Stored Time is Increased.

When information is ordered up by the actuation of one of the switches 48 associated with the remote electronics and display unit 14, the information is transmitted from the non-volatile memory on the data bus 50 to the 8 bit storage and shift register unit 52. The information is then transmitted serially on lead 54 to the output driver 58 and is transmitted on lead 60 to the remote electronics and display unit 14,16.

The power supply 62 is conventional and merely converts from the 24 volt aircraft power supply to the plus and minus 12 volts required for operation of the electronic circuitry and to the +5 volt signal required for certain of the additional circuits.

Figure 2:
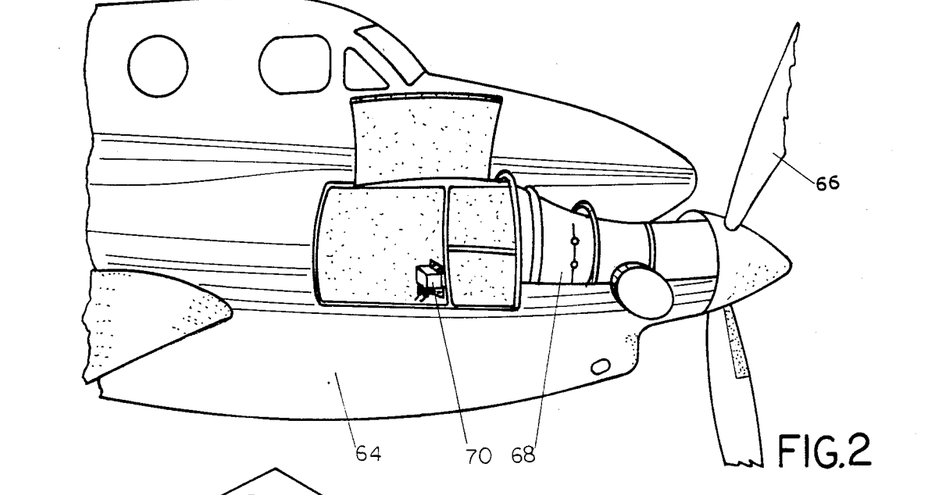
FIG. 2 is a schematic showing of a two-engine aircraft in which the propellers are powered by turbine engines.

FIG. 2 is showing of a prop jet aircraft in which the aircraft 64 is driven by the propeller 66 powered from the turbine engine 68. The aircraft 64 is of course a twin-engine plane, with the other engine being located beyond the main fuselage. In FIG. 2 the one engine-mounted electronics unit 70 is shown, and there is of course another one mounted in the left engine. The circuitry as shown in FIG. 1 is that which is included within the unit 70, while the thermocouple 12 (which may represent a series of thermocouples) is mounted adjacent to the engine 68, normally near the exhaust or at an interstage location of this engine. The single remote unit 14 with the associated display 16 and switches 48, may be mounted within the cockpit compartment, or may be a portable test unit provided for maintenance

TABLE I

| Temperature Channel | Function | Temperature Band Limits ±5° C.* | | Resolution Time Recording* | Display Format | |
| --- | --- | --- | --- | --- | --- | --- |
| | | (Lower) | (Upper) | | | |
| 1 | Number of Starts | 300° C.- | — | — | 99999 | cycles |
| 2 | Running Time | 300° C.- | — | 0.1 hours | 9999.9 | hours |
| 3 | Total Time over 819.5° C. | 819.5° C.- | 830.8° C. | .01 hours | 999.99 | hours |
| 3A | Time Exceeding Band Limits | 819.5° C.- | 830.8° C. | .01 hours | 999.99 | hours |
| 4 | Time Exceeding 830.8° C. | 830.8° C.- | 838.0° C. | .001 hours | 99.999 | hours |
| 4A | Time Exceeding Band Limits | 830.8° C.- | 838.0° C. | .001 hours | 999.99 | minutes |
| 5 | Total Time over 838.0° C. | 838.0° C.- | 849.3° C. | .01 minutes | 999.99 | minutes |
| 5A | Time Exceeding Band Limits | 838.0° C.- | 849.3° C. | .01 minutes | 999.99 | minutes |
| 6 | Time Over 849.3° C. | 849.3° C.- | — | .01 seconds | 999.99 | seconds |

*Limits subject to engine manufacturer requirements.

The foregoing steps are set forth in slightly different format in table II:

TABLE II

1. Periodic Sampling of Temperature Input
2. Digital to Analog Conversion
3. Comparator Step.
4. Identification of Memory Locations for Time Information for Each Specific Temperature Range and repair. In either case, both of the two engine mounted units are connected to a single remote unit 14, 16.

Figure 3:
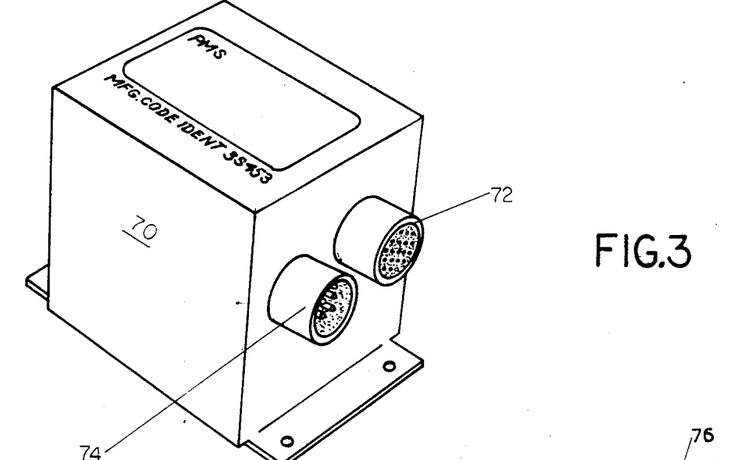
FIG. 3 is an exterior view of the engine mounted electronic unit.

FIG. 3 shows the exterior configuration of an engine mounted unit 70 including the terminal plugs 72 and 74.

Figure 4:
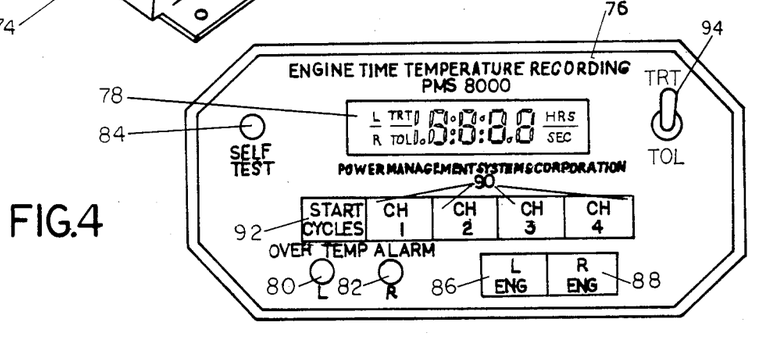
FIG. 4 shows a display and switching panel which may be mounted either on the dashboard in the airplane cockpit, or in a remote portable test unit.

FIG. 4 shows the display which may be part of the instrument display in the cockpit or may be included on the portable test unit which may be used for ground servicing. The display panel 76 includes the digital display 78, the over-temperature alarm signals 80 and 82 for the left and the right engines, respectively, the self-test switch and signal 84, the push-button switches 86 and 88 for the left and the right engines, respectively, and the channel selection switches 90. At the left hand end of the row of channel swlection switches 90 is the additional switch 92 designated "start cycles", and depressing this pushbutton switch causes a number to appear on the display unit 78 representing the number of times that the temperature of the engine has risen to a temperature above 300° C. a very low temperature for a turbine engine, and then returned to a temperature below this level. The switch 94 may be used with each channel and indicates either the total time over limits ("TOL", which refers to the length of time beyond the manufacturers rated time of operation in the particular temperature band); and the switch position designated "TRT" which indicates the total running time over the minimum temperature of the band under consideration.

Figure 5A:
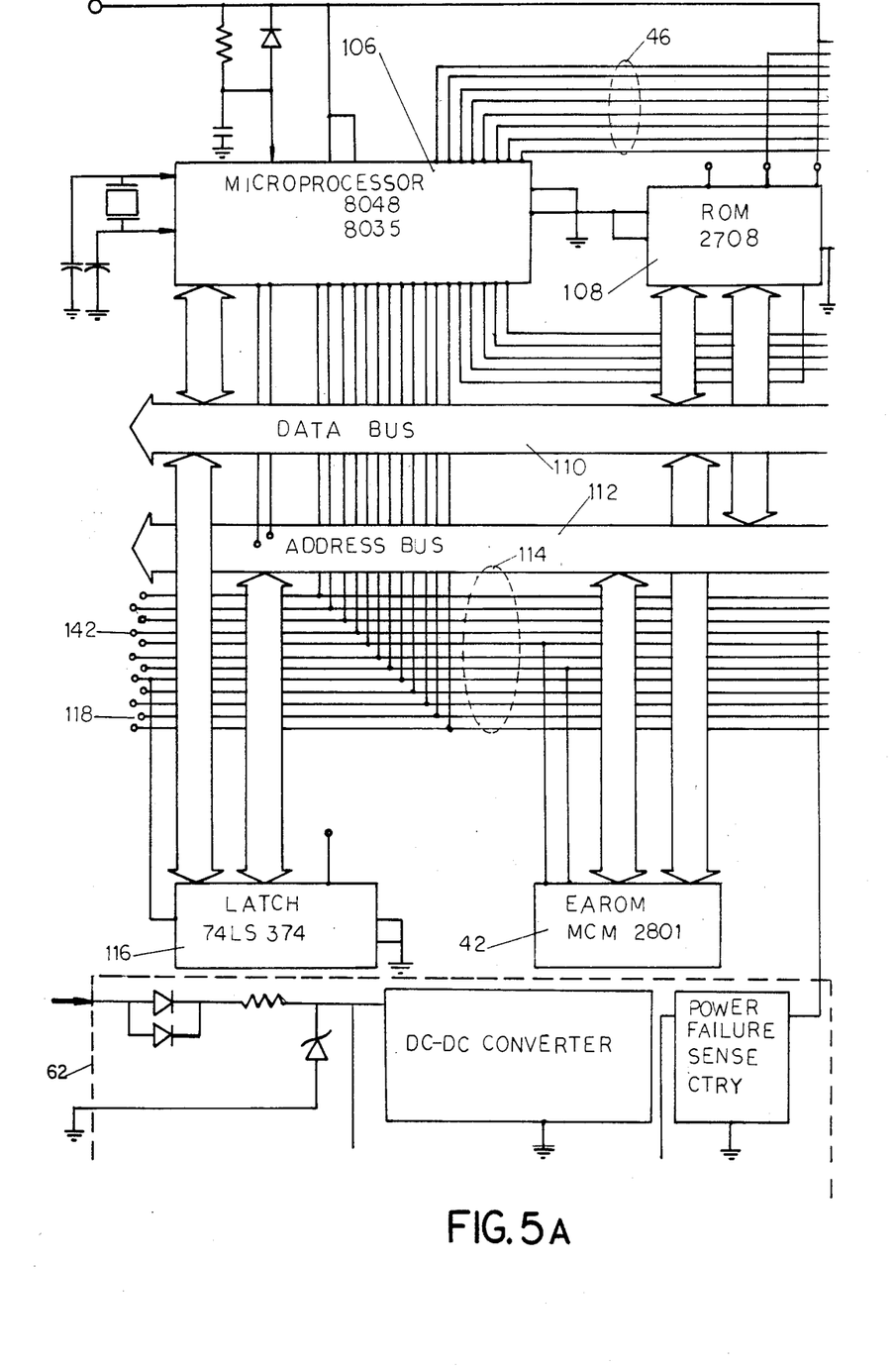
FIGS. 5A and 5B are circuit diagrams indicating the actual circuitry included within the engine mounted electronics units.
Figure 5B:
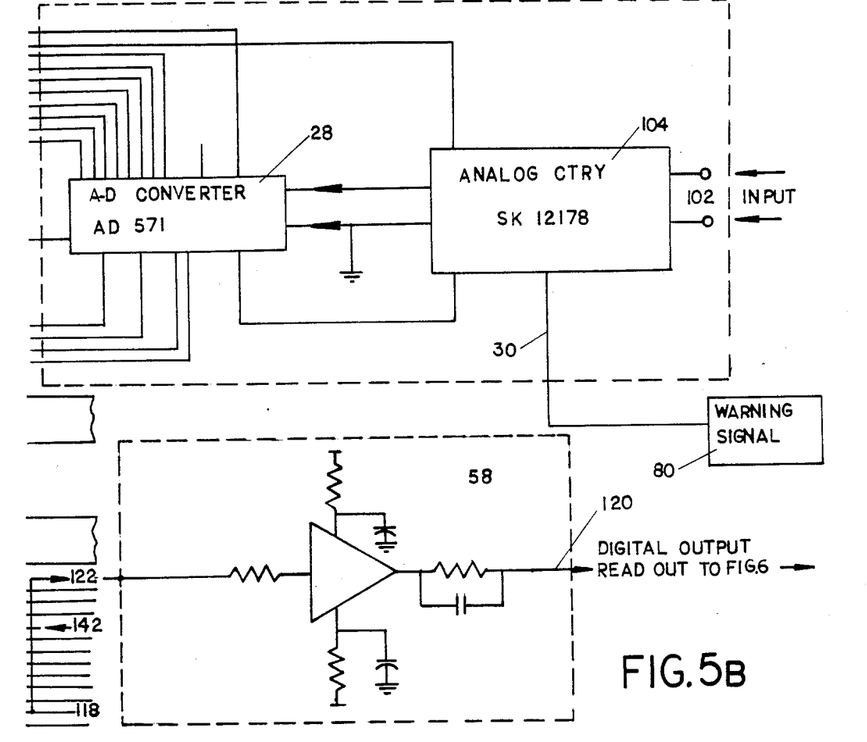

Now, turning to FIGS. 5A and 5B, this is a somewhat more detailed showing of the circuit of FIG. 1. More specifically, the output from the thermocouple is applied to the terminals 102 at the input to the analog circuit 104. Incidentally, this analog circuit 104 will be shown in greater detail in connection with FIG. 7, and serves to compensate and amplify the temperature signal provided by the thermocouple. The output from the analog circuitry 104 is applied to the analog-to-digital converter 28. The output leads 46 from the analog-to-digital converter supply a ten bit conversion of the temperature level to the microprocessor chip 106, which for example may be an Intel chip such as the 8035 or the 8048. The ROM 108 includes sequential instructions for the operation of the microprocessor 106 and for the periodic sampling of temperature data. Incidentally, in addition to just temperature data, other inputs may could be provided to the engine mounted electronic unit, such as overtorque and overspeed warning functions; and these could be converted from analog input signals to digital signals, multiplexed with the input temperature signals, supplied to the micro-processor, and eventually ordered up for display by depressing pushbuttons such as the switches 48 as shown in FIG. 1 and the switches 90 and 92 in FIG. 4.

Three buses which are included in FIG. 5 include the data bus 110, the address bus 112, and the control bus 114; and data carried on the data bus 110 may be supplied to or from the microprocessor 106, and to or from the EAROM 42 which is a non-volatile memory unit, in accordance with instructions provided on the address bus 112. The letters "EAROM"0 stand for "Electrically Alterable Programmable Read-Only Memory". The latch 116 buffers between the data and the address buses and the memory 42 and the microprocessor 106. It may be noted that the serial transmission line or port 118 included in the control bus 114 is employed to direct serial output signals to the output driver 58 which amplifies the data which has been ordered up by depressing selected keys or switches on the display unit, and transmits this data on a serial basis over output lead 120. The lead 122 connects the data lead 118 to the output driver 58. It is to be noted that a parallel data transmission is also feasable, but serial is more economical cabling.

It is also noted that the lead 30 connected from the analog circuitry 104 extends in due course to the remote warning lamp 80', prime, which appears as light 80 in FIG. 4. This signal is actuated when the temperature exceeds the maximum temperatures as shown in FIG. 7, to be discussed in greater detail below.

Figure 6:
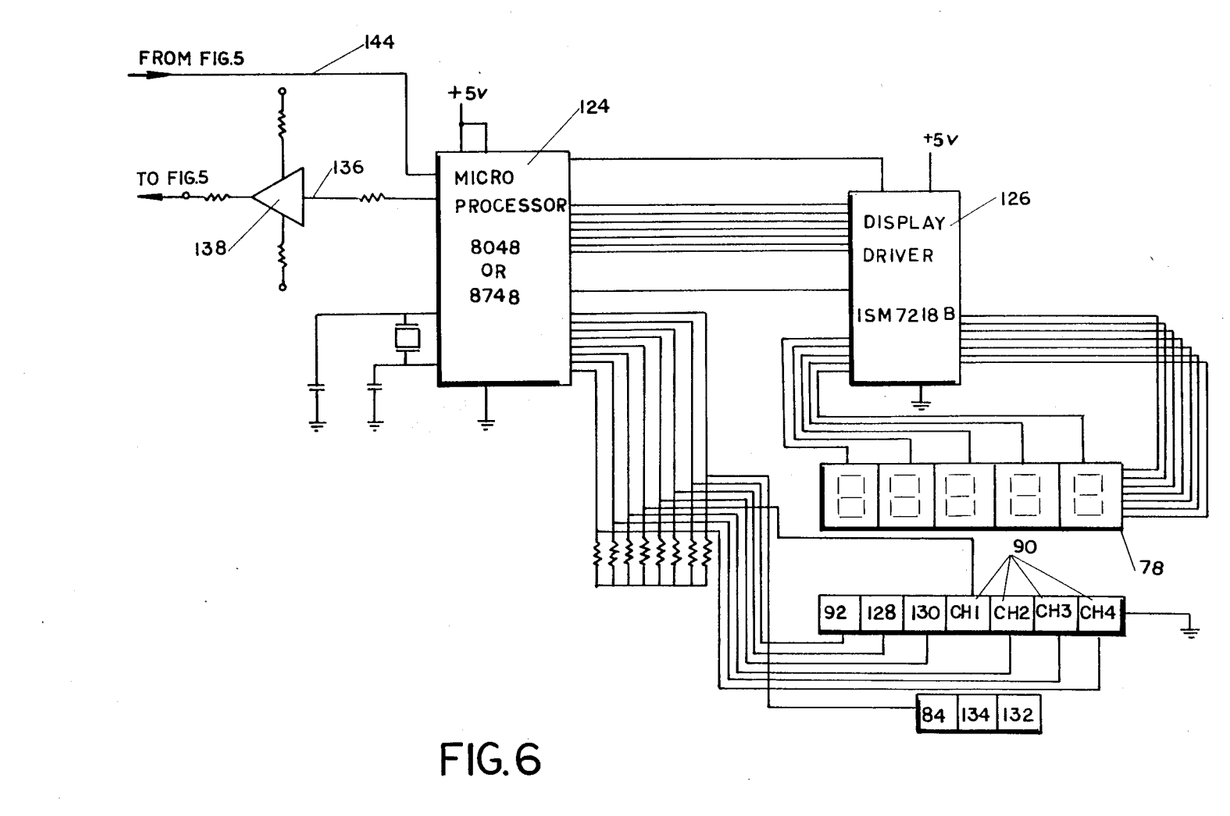
FIG. 6 shows the electronics included in the remote unit.

FIG. 6 shows the remote circuitry which may be either cockpit mounted, or be included in a ground portable model which may be selectively plugged in to the engine mounted units on the left and the right engines. FIG. 6 includes the microprocessor 124 and the display driver 126 in addition to a five-digit display 78 and the switches 90, 92, 128 and 130. Additional switches include the self-test switch 84 and the power on and off switches 132 and 134.

When one of the temperature channel switches 90, together with one of the switches 128 or 130 is selected, the appropriate interrogation signal is supplied from microprocessor 124 (which includes memory) over lead 136 through amplifier 138 to the interrogation lead 140 which is connected to the interrogation input lead 142 included in the control bus 114. The appropriate information is then ordered up from the non-volatile memory 42 and is transmitted in serial form over leads 118, 122, and 120 to input lead 144 to the microprocessor chip 124 in the remote unit. The display driver 126 is then energized in accordance with conventional and known digital data processing techniques to display the transmitted data on the display 78.

Figure 7A:
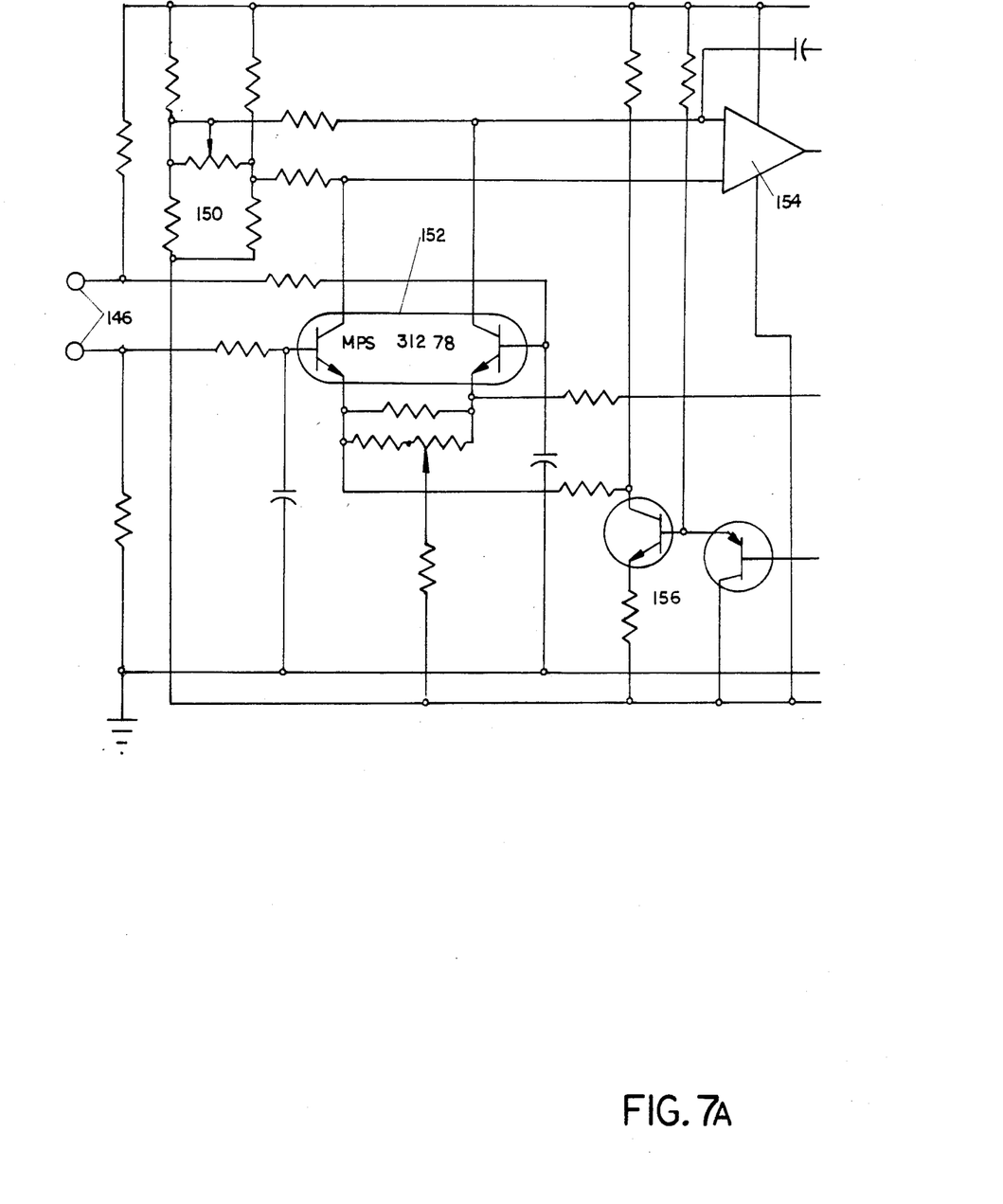
FIGS. 7A and 7B are a detailed circuit diagram showing the amplification and analog-to-digital conversion circuitry which modifies the input temperature signal from the thermocouple.
Figure 7B:
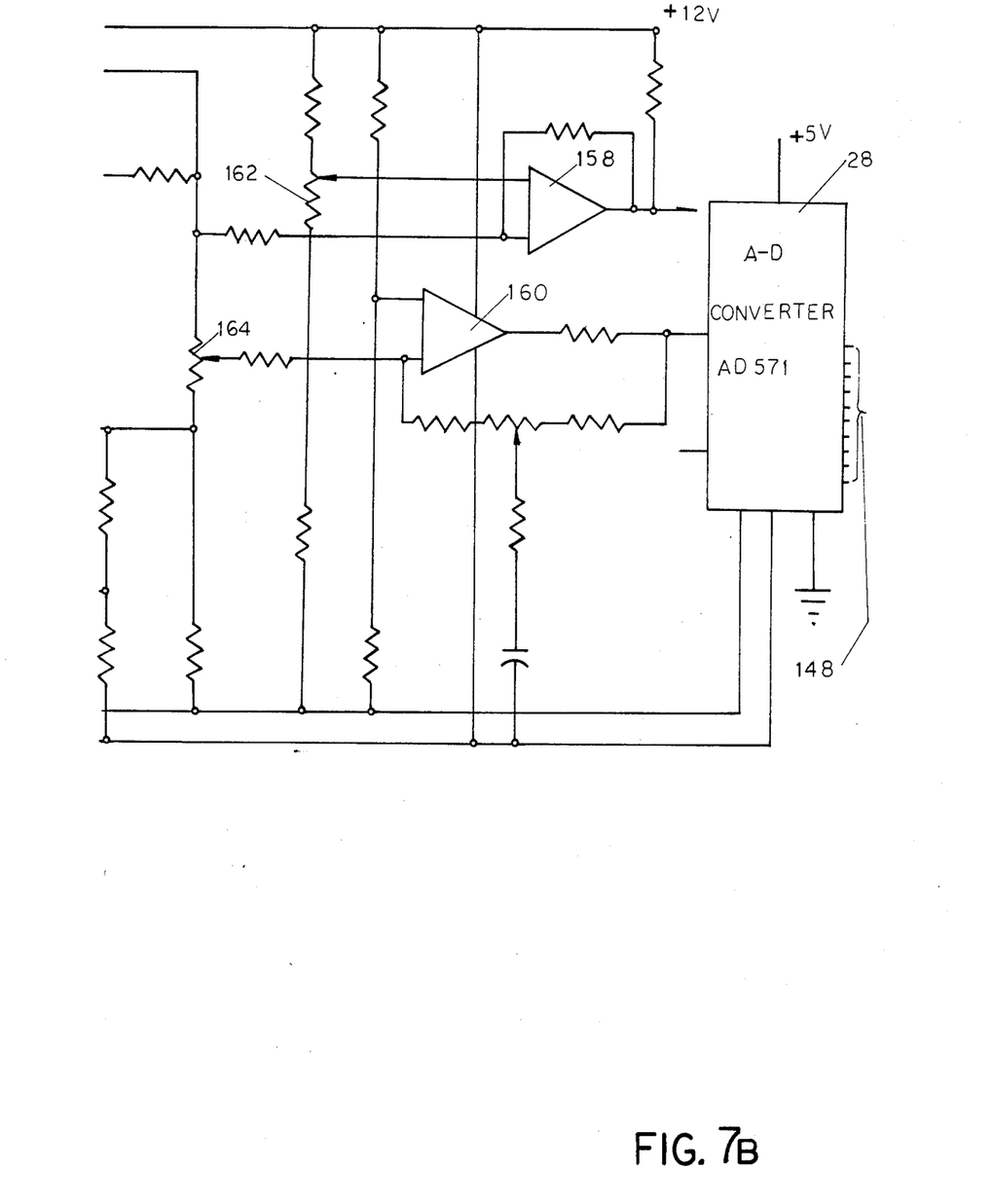

Turning now to FIGS. 7A and 7B, this input circuit has a thermocouple input to the terminals 146, and a digital temperature output at the far right-hand side of FIG. 7 at the leads 148 from the analog to the digital converter unit 28. The circuitry includes the thermocouple cold-junction temperature compensation bridge 150 and the differential amplifier 152. The output signal from the differential amplifier 152 is amplified by operational amplifier 154 which provides at its output a substantially linear voltage representing the temperature of the turbine engine. Incidentally, a constant current source 156 is included in the circuitry to control emitter current flow in differential amplifier 152. The operational amplifier 158 drives the over-temperature alarm light 80 or 82 as shown in FIG. 4. The operational amplifier 160 couples the output from operational amplifier 154 to the analog-to-digital converter 28. Incidentally, the levels for the temperature alarm signal and for the input to the analog-to-digital converter are established by the potentiometers 162 and 164, respectively. These may of course be adjusted and calibrated to give the desired signal at the proper temperature levels, and to accommodate slight variations in thermocouple output or in the amplification provided by the input circuitry, for example. The output leads 148 at the right-hand side of FIG. 7 are coupled to the 10 bit data bus 46 as shown in FIG. 1.

Figure 8:
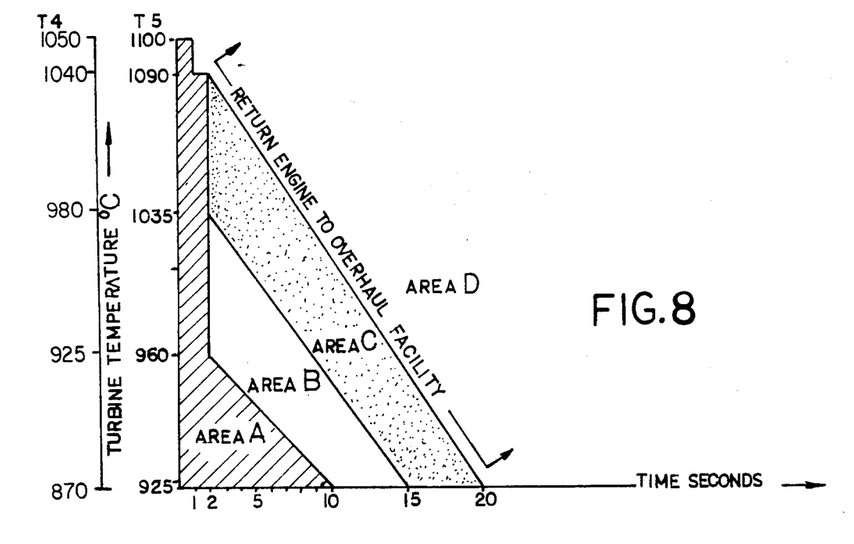
FIG. 8 is a plot indicating the over-temperature ranges for a typical turbine engine, with the allowable time at each temperature level being plotted against turbine temperature.

Now, turning to FIG. 8, this drawing indicates a typical manufacturer's diagram of over-temperature conditions which may be damaging to the turbine engine in the event that they last longer than certain predetermined limits. First, it may be noted that the horizontal axis of the plot inicates the time in seconds, and the vertical axis of the plot is the temperature in degrees centigrade. The temperature scale has two different plots, one designated T-4 and the other designated T-5. The reason for the different scales involves the different temperatures at successive points along the turbine engine, from T-1 at the engine inlet to T-6 or T-7 at the exhaust. The thermocouple may be located at any of several points at or following the combustion zone, to indicate the engine operating temperature, but the temperatures sensed at these various points will vary significantly, from the turbine inlet point to the turbine inter stage temperature point, to the exhaust zone, and the circuitry must be adjusted to correspond to the actual physial locations of the thermocouple along the turbine engine.

Now, referring to FIG. 8 in more detail, the area indicated by the designation "Area A" in FIG. 8 is a permitted area. This means, for example, that at a T-5 temprature of 930° C., just over the 925° C. initial point in the characteristic, the engine may be operated for 10 seconds and not be damaged or require maintenance. However, beyond this time interval, when it goes into "Area B", certain inspection steps should be taken. Similarly, for Areas C and D, successive more complete inspections and overhaul may be required. More specifically, for Area B it is recommended that the cause of the over-temperature be determined and corrected and that the engine be visually inspected through the exhaust ports of the power turbine blades and through the exhaust duct turning vanes where appropriate; and a record should be made in the engine log book. For Area C, a hot section inspection should be performed; the compressor blades should be stretch checked without removing the blades from the disk; and a fluorescent penetrant inspection should be made of the compressor turbine and power turbine discs and blades without removing the blades from the disks. For Area D, the engine should be returned to an overhaul facility, the compressor turbine blades and power turbine blades must be discarded, and both of the turbine discs must be subjected to a stretch check and fluorescent penetrant inspection.

Concerning the "time over limits" channels such as 3A and 4A, on each occasion when the engine temperature goes up to an elevated level and remains there for more than the indicated time interval, this time period beyond the allowable time priod is recorded and added to that previously stored in the non-volatile memory. Thus, for example, if an engine were allowed to remain in channel 5A for 10 seconds, and it actually remained at a temperature above the minimal level for channel 5A for 15 seconds, then 5 seconds would be added to the value stored in the non-volatile memory for channel 5A.

In conclusion, it is to be understood that the foregoing is a description of one illustrative, preferred embodiment of the invention. Other electronic circuit arrangements for implementing the functions described hereinabove may be employed. By way of example, but not of limitation, other logic chips may be employed to implement the indicated function without departing from the spirit and scope of the invention; a series of thermocouples, resistance thermometers, optical temperature sensors, or any other means for measuring teperature, located at desired points along the turbine engine may be used instead of the schematic indication of a single thermocouple as shown in the drawing; and it is to be expected that the values as set forth in Table I and in FIG. 8 will vary from one turbine engine to another and that these are merely representative of particular engines under consideration. Also, differences in display and switching arrangements are expected between cockpit mounted and portable test units, and when one or multiple engine planes are involved, and the arrangements of FIGS. 4 and 6 show typical variations. Accordingly, the present invention is not limited to the particular system as shown in the present drawings and as described in this specification.

What is claimed is:

1. A turbine engine monitoring and recording system comprising:
   an engine-mounted electronic circuit means, including a data processor such as a microprocessor or microcomputer and a non-volatile memory for receiving engine operating information and for storing such information;
   additional electronic circuit means, remote from the turbine engine, and including an additional microprocessor and display means;
   temperature sensing means mounting on said engine for supplying temperature information to said engine-mounted circuit means;
   circuit means included in said engine-mounted electronic circuit means for storing information indicating the number of times that the turbine engine has been started, and the cumulative length of time that the turbine has been operated above each of a plurality of predetermined temperature levels and within predetermined temperature bands;
   additional circuit means for interconnecting said remote circuit means with said engine mounted circuit means;
   said system including for each temperature channel, means for storing both the total time the turbine engine has been operated above each predetermined temperature defining the lower limit of the channel, and also the time the turbine engine has been operated above each said predetermined temperature beyond the manufacturers specified time limit for each operation above that temperature, to provide an indication of the cumulative operating time over limits; and
   switch means associated with said remote electronic circuit means for ordering selected information stored in said non-volatile memory, and for displaying the ordered information on said display means.

2. A system as defined as defined in claim 1 including means for transmitting data from said engine mounted circuit means to said remote electronic circuit means serially over a single conductor, whereby the number of conductors extending between said engine-mounted and said remote circuit means is minimized.

3. A turbine engine monitoring and recording system comprising:
   thermocouple means for monitoring the temperature of a jet engine;
   digital circuit means for storing in a plurality of digital storage locations, channels of information corresponding to the cumulative time of operation of said engine above a corresponding plurality of predetermined temperature levels;
   circuit means for receiving input temperature signals from said thermocouple means and for deriving therefrom said plurality of channels of information for storage in said digital storage locations;
   means for periodically up-dating the stored temperature channel information;
   means for displaying digital information;
   monitor circuit means;
   additional circuit means for intercoupling said displaying means and said monitor circuit means to receive information from said storage means;
   said system including for each temperature channel, means for storing both the total time the turbine engine has been operated above each predetermined temperature defining the lower limit of the channel, and also the time the turbine engine has been operated above each said predetermined temperature beyond the manufacturers specified time limit for each operation above that temperature, to provide an indication of the cumulative operating time over limits; and said monitor circuit means including a plurality of temperature channel switches corresponding respectively to said plurality of channels of temperature-time information stored in said digital circuit means, for causing the display in said displaying means of the up-dated information corresponding to the activated switch.

4. A system as defined in claim 3 wherein at least four different temperature channels and corresponding switches are provided.

5. A system as defined in claim 3 wherein means are also provided for storing a digital representation of the number of times the turbine engine has been started.

6. A system as defined in claim 3 wherein said digital circuit means includes an electronically alterable non-volatile storage means.

7. A system as defined in claim 3 wherein said digital circuit means is mounted in the engine compartment of an aircraft, and wherein said displaying means and said monitor circuit means including said switches are located remotely from said digital circuit means.

8. A system as defined in claim 7 further including means for transmitting the temperature channel information to be displayed from said digital circuit means to said display means, serially.

9. A system as defined in claim 7 wherein both said circuit means for receiving temperature signals and deriving temperature channel information, and also said monitor circuit means, include separate micro-processors.

10. A turbine engine monitoring and recording system comprising:

engine mounted electronic circuit means including a microprocessor and a non-volatile memory for receiving engine operating information and for storing such information;

additional electronic circuit means, remote from the turbine engine, and including an additional microprocessor and display means;

circuit means included in said engine mounted electronic circuit means for determining and for recording in said non-volatile memory information indicating the number of times that the turbine engine has been started, and the cumulative length of time that the turbine engine has been operated above each of a plurality of predetermined temperature levels and within predetermined temperature bands;

additional circuit means for interconnecting said remote circuit means with said engine mounted circuit means;

said system including for each temperature channel, means for storing both the total time the turbine engine has been operated above each predetermined temperature defining the lower limit of the channel, and also the time the turbine engine has been operated above each said predetermined temperature and within each temperature band beyond the manufacturers specified time limit for each operation above that temperature, to provide an indication of the cumulative operating time over limits; and switching means associated with said remote electronic circuit means for ordering selected information stored in said non-volatile memory, and for displaying the ordered information on said display means.

11. A system as defined in claim 10 including means for transmitting said selected information serially from said engine mounted circuit means to said remote circuit means including said display means.

* * * * *